(12) United States Patent
Stanescu

(10) Patent No.: US 10,113,602 B2
(45) Date of Patent: Oct. 30, 2018

(54) LOAD CONTROLLING BOLTED FLANGE DEFORMABLE SPACERS

(71) Applicant: The Boeing Company, Chicago, IL (US)

(72) Inventor: Adrian Stanescu, Maple Valley, WA (US)

(73) Assignee: The Boeing Company, Chicago, IL (US)

(*) Notice: Subject to any disclaimer, the term of this patent is extended or adjusted under 35 U.S.C. 154(b) by 107 days.

(21) Appl. No.: 15/180,059

(22) Filed: Jun. 12, 2016

(65) Prior Publication Data
US 2017/0356516 A1    Dec. 14, 2017

(51) Int. Cl.
*F16B 43/02* (2006.01)
*F16F 7/12* (2006.01)
*B64D 29/06* (2006.01)
*F16B 31/02* (2006.01)

(52) U.S. Cl.
CPC ............... *F16F 7/12* (2013.01); *B64D 29/06* (2013.01); *F16B 31/028* (2013.01); *F16B 43/02* (2013.01)

(58) Field of Classification Search
CPC ......... F16F 7/12; F16B 5/0258; F16B 31/028; F16B 43/02; B64D 29/06
USPC ...................... 411/546; 16/2.1, 2.3
See application file for complete search history.

(56) References Cited

U.S. PATENT DOCUMENTS

| | | | | |
|---|---|---|---|---|
| 1,460,513 A | * | 7/1923 | Ross | B62D 1/16 16/2.1 |
| 1,738,037 A | * | 12/1929 | Collins | B62D 1/16 16/2.1 |
| 2,918,841 A | * | 12/1959 | Poupitch | F16B 13/061 411/36 |
| 3,735,665 A | * | 5/1973 | Mortensen | F16B 13/00 411/36 |
| 3,829,184 A | * | 8/1974 | Chevret | F16C 11/04 16/2.1 |

(Continued)

FOREIGN PATENT DOCUMENTS

EP    2602434 A2    6/2013
WO    WO 2013/192558 A1    6/2013

OTHER PUBLICATIONS

Extended European Search Report for related European Application No. EP 17168028.3, report dated Nov. 7, 2017.

*Primary Examiner* — Roberta S Delisle
(74) *Attorney, Agent, or Firm* — Miller, Matthias & Hull LLP

(57) ABSTRACT

Deformable spacers and spacer assemblies absorb energy when flange bolts are subjected to compressive axial loads by plastically deforming, failing in shear, rupturing or in a combination of failure modes so the flange bolts and the flanges connected thereby are not damaged. One deformable spacer may have a hollow cylindrical body with a plurality of elongated slots there through. Another deformable spacer may have an annular stiffener extending inwardly from an inner surface of a hollow cylindrical body. A spacer assembly may include an inner cylindrical body, and outer cylindrical body, and an annular shoulder extending from one of the bodies and engaged by the other body shears when a shear failure load is applied to the flange bolt. Another spacer assembly may include an annular belt around a cylindrical body so that the belt will rupture before the cylindrical body plastically deforms.

20 Claims, 8 Drawing Sheets

(56) References Cited

U.S. PATENT DOCUMENTS

| | | | | |
|---|---|---|---|---|
| 3,942,407 | A | * | 3/1976 | Mortensen ............ F16B 37/067 411/36 |
| 4,875,815 | A | * | 10/1989 | Phillips, II .......... F16B 19/1054 411/183 |
| 4,984,946 | A | * | 1/1991 | Phillips, II .............. B29C 45/16 411/183 |
| 5,069,586 | A | * | 12/1991 | Casey .................. A44B 13/007 16/2.1 |
| 5,246,323 | A | * | 9/1993 | Vernet ................... F16B 13/061 411/183 |
| 6,761,520 | B1 | | 7/2004 | Dise |
| 8,192,102 | B2 | | 6/2012 | Heidari et al. |
| 8,814,462 | B2 | | 8/2014 | Care |
| 2010/0129137 | A1 | | 5/2010 | Heidari et al. |

* cited by examiner

LOAD CONTROLLING BOLTED FLANGE DEFORMABLE SPACERS

TECHNICAL FIELD

The present disclosure relates generally to an energy absorbing apparatus and a method for securing parts to each other and, more particularly, to an apparatus and method for ensuring bolted joints can withstand destructive force levels using deformable spacers and spacer assemblies.

Background

When manufacturing objects such as engines or generators that could be used in automobiles or aircrafts, parts that may be subjected to shock or impact loads may be secured to each other using fasteners or bolts having deformable spacers. For example, when securing an inlet to an engine case, fasteners in the form of bolts and nuts may be used to attach an inlet to the engine case. In designing an engine, the inlet, engine case, and bolts are selected in a manner that may reduce a risk that the inlet may become detached from the engine case if a blade in the engine becomes detached and/or fails during operation of the engine and creates an impact load tending to pull the inlet away from the engine case. The inlet should remain intact and attached to the engine case, and the blades should remain contained within the engine case.

Currently, this type of result is achieved through a selection of the number of bolts and the type of bolts in a manner that provides a capability to withstand forces of high magnitudes that may be applied to the inlet if a rapidly rotating fan blade becomes detached from the engine. The selection of bolts and the design of the inlet and engine case to withstand such forces of high magnitude can increase the weight of the aircraft. However, this design may result in an increase in the number of bolts and/or the size of the bolts. The design also may increase the thickness and/or size of flanges for the inlet and engine case where the bolts may be used to secure the inlet to the engine case.

One currently used solution for reducing the weight and/or cost of securing an inlet to an engine case involves using load-absorbing elements, such as deformable spacers. Deformable spacers may be used with bolt and nut assemblies to absorb energy that may be applied to the bolt and nut assembly when impact loading occurs. Currently known deformable spacer designs, however, are, in general, inefficient in absorbing energy and may not be as effective in minimizing the force transmitted to the nut and bolt assemblies and the connected components.

SUMMARY OF THE DISCLOSURE

In one aspect of the present disclosure, a deformable spacer for absorbing energy for a flange bolt is disclosed. The deformable spacer may include a hollow cylindrical body having a first body end, a second body end, a body outer surface having a body outer diameter, a body inner surface having a body inner diameter and a body longitudinal axis. The deformable spacer may also include a plurality of elongated slots extending through the hollow cylindrical body from the body inner surface to the body outer surface. The plurality of elongated slots are circumferentially spaced about the hollow cylindrical body.

In another aspect of the present disclosure, a deformable spacer for absorbing energy for a flange bolt is disclosed. The deformable spacer may include a hollow cylindrical body having a first body end, a second body end, a body outer surface having a body outer diameter, a body inner surface having a body inner diameter and a body longitudinal axis, and an annular stiffener extending inwardly from the body inner surface and having a stiffener inner diameter that is less than the body inner diameter.

In a further aspect of the present disclosure, a spacer assembly for absorbing energy for a flange bolt is disclosed. The spacer assembly may include an inner body having a first inner body end, a second inner body end, an inner body outer surface having an inner body outer diameter, and inner body inner surface having an inner body inner diameter and an inner body longitudinal axis, and an outer body having a first outer body end, a second outer body end, an outer body outer surface having an outer body outer diameter, an outer body inner surface having an outer body inner diameter that is greater than the inner body outer diameter so that the inner body and the outer body are substantially concentric when the first inner body end is inserted into the first outer body end. The spacer assembly may further include an annular shoulder extending from one of the inner body and the outer body so that the other of the inner body and the outer body makes contact with the annular shoulder when the first inner body end is inserted into the first outer body end to prevent the inner body from passing through the outer body. The annular shoulder is configured to fail in shear when a compressive axial load forcing the inner body and the outer body toward each other exceeds a predetermined shear failure load.

In a still further aspect of the present disclosure, a spacer assembly for absorbing energy for a flange bolt is disclosed. The spacer assembly may include a hollow cylindrical body having a first body end, a second body end, a body inner surface, a body outer surface having a body outer diameter and a body longitudinal axis, and an annular belt disposed on the body outer surface and engaging the body outer surface to retain the annular belt in position relative to the first body end and the second body end. When a compressive axial load is applied to the hollow cylindrical body, the body outer diameter increases causing the annular belt to rupture before the hollow cylindrical body plastically deforms.

Additional aspects are defined by the claims of this patent.

DETAILED DESCRIPTION

Figure 1:
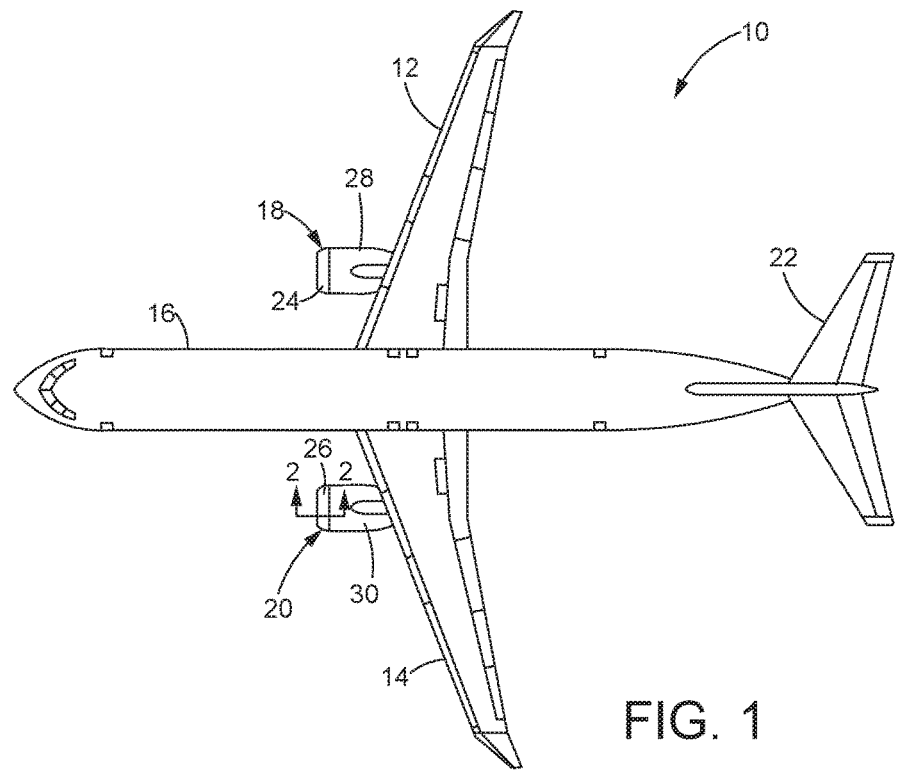
FIG. 1 is a plan view of an aircraft in which deformable spacers and spacer assemblies in accordance with the present disclosure may be implemented.

FIG. 1 illustrates an exemplary aircraft 10 in which nut and bolt assemblies incorporating deformable spacers in accordance with the present disclosure may be implemented. In this illustrative example, the aircraft 10 may include wings 12, 14 attached to a body or fuselage 16. The aircraft 10 includes an engines 18, 20 mounted to the wings 12, 14, respectively, and a tail 22 mounted at the rear of the fuselage 16. For example, and without limitation, deformable spacers in accordance with the present disclosure may be used to connect inlets 24, 26 to corresponding engine cases 28, 30 of the engines 18, 20, respectively. Although an aerospace example is shown, different advantageous examples of the deformable spacers may be applied in other industries, such as the automotive industry.

Figure 2:
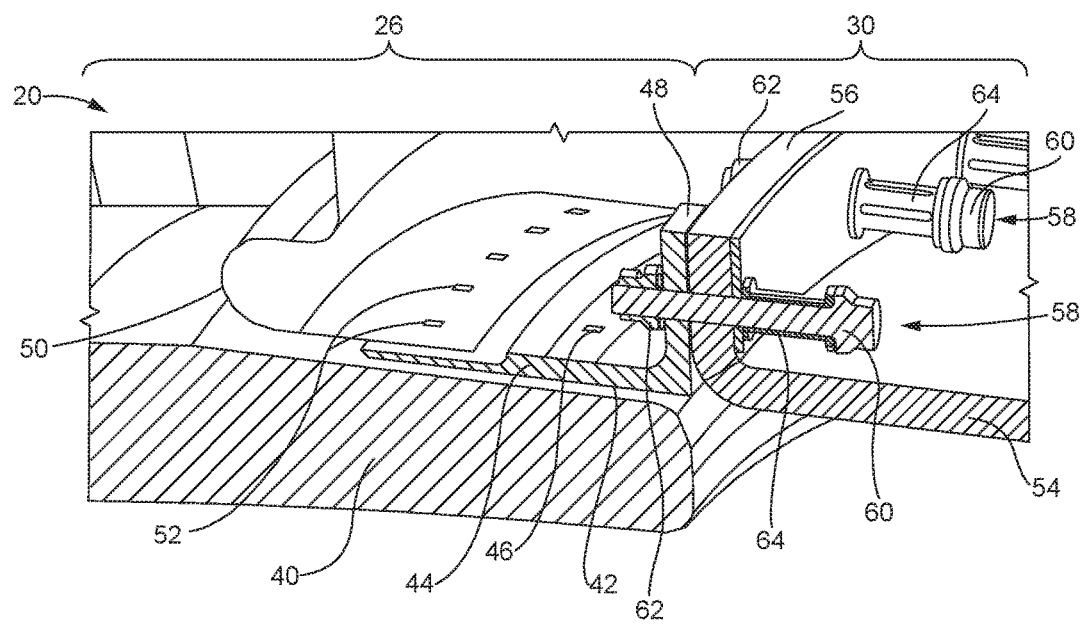
FIG. 2 is a partial cross-sectional view of an engine of the aircraft of FIG. 1 taken through line 2-2.

With reference to FIG. 2, a partial cross-sectional view of a portion of the engine 20 is depicted to illustrate an example of an environment in which deformable spacers in accordance with the present disclosure may be implemented. In this example, the partial cross-sectional view of the engine 20 illustrates components of the inlet 26 on the left side of the figure, and components of the engine case 30 on the right side. The inlet 26 may include an inlet inner barrel 40 with a generally hollow cylindrical shape. An annular inlet attachment ring 42 may be mounted on an outer surface of the inlet inner barrel 40 and include a ring body 44 secured to the inlet inner barrel 40 by a plurality of ring fasteners 46. The inlet attachment ring 42 may also include an inlet flange 48 extending radially from a rearward or aft end of the ring body 44. The inlet flange 48 may be an annulus extending circumferentially about the entire outer surface of the inlet inner barrel 40, or may be a series of outwardly extending flange tabs spaced circumferentially about the ring body 44 at the locations at which the inlet 26 will be fastened to the engine case 30. The inlet 26 may further include an annular load absorber 50 attached to the outer surfaces of the inlet inner barrel 40 and the inlet attachment ring 42 by a plurality of absorber fasteners 52.

The engine case 30 may include a containment or fan case 54 having a generally hollow cylindrical shape. The fan case 54 may be affixed to the wing 14 and may enclose the components of the engine 20. The fan case 54 may also include a fan case flange 56 extending radially from a forward end of the fan case 54, and may face and engage the inlet flange 48 when the inlet 26 is mounted onto the engine case 30. Similar to the inlet flange, the fan case flange 56 may be an annulus extending circumferentially about the entire outer surface of the fan case 54, or may be a series of outwardly extending flange tabs spaced circumferentially about the fan case 54.

The inlet 26 may be mounted to the engine case 30 with the flanges 48, 56 facing and engaging and secured to each other by flange bolt assemblies 58. Each flange bolt assembly 58 may include a flange bolt 60 with a flange bolt shank extending through aligned openings through the flanges 48, 56, a nut 62 screwed onto the flange bolt 60, and a deformable spacer 64 disposed on the flange bolt shank of the flange bolt 60. In the illustrated installation, the deformable spacer 64 is disposed between a flange bolt head 66 of the flange bolt 60 and the fan case flange 56 to space the flange bolt head 66 from the fan case flange 56. In alternative installations, the flange bolt head 66 and the deformable spacer 64 could be disposed on the opposite side of the interface of the flanges 48, 56 with the deformable spacer 64 spacing the flange bolt head 66 from the inlet flange 48, or with the deformable spacer 64 disposed proximate the nut 62 and spacing the nut 62 from the flanges 48, 56. As discussed further below, once the inlet 26 is assembled to the engine case 30 by the flange bolt assemblies 58, the deformable spacers 64 will deform plastically when shock or impact loads tending to pull the inlet 26 away from the engine case 30 exceed a predetermined failure load to absorb energy from the load and prevent damage to the flange bolts 60, the flanges 48, 56 and other components of the engines 18, 20.

Figure 3:
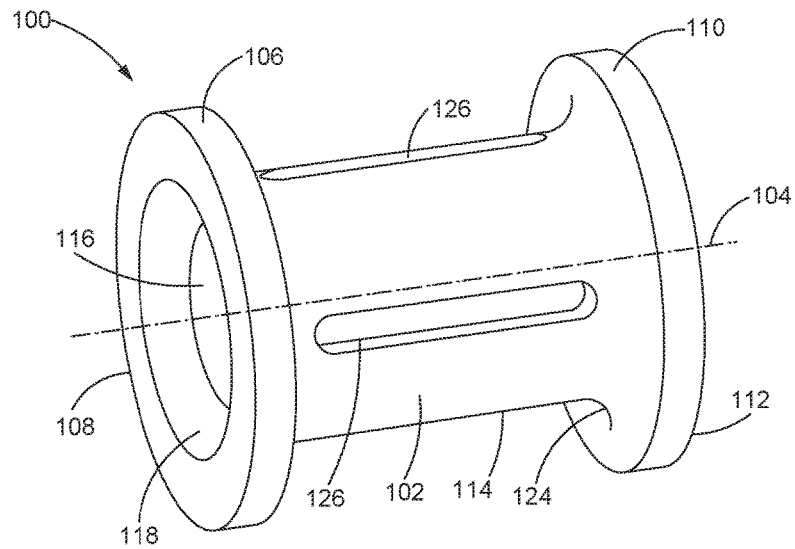
FIG. 3 is an isometric view of an example of a deformable spacer in accordance with the present disclosure.
Figures 4, 5:
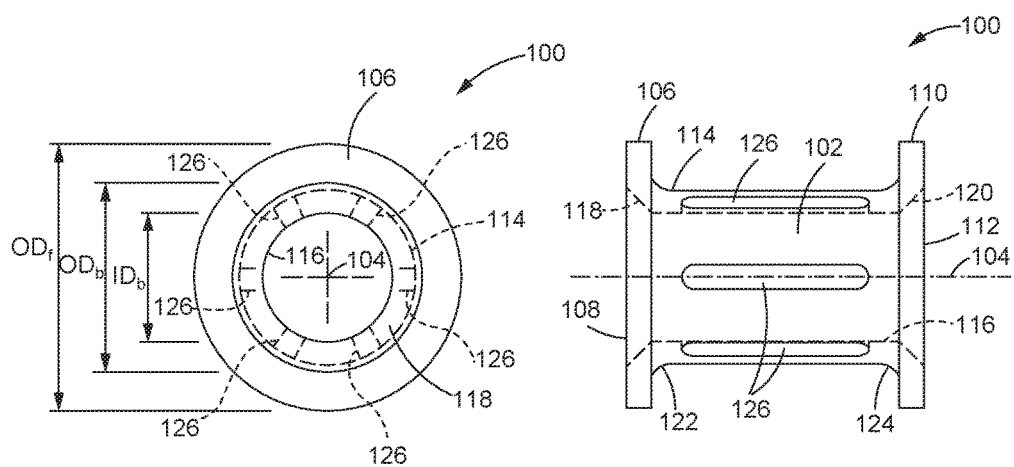
FIG. 4 is an end view of the deformable spacer of FIG. 3.
FIG. 5 is a side view of the deformable spacer of FIG. 3.

With reference now to FIG. 3, a perspective view of a deformable spacer 100 is illustrated as one example for the deformable spacer 64 in the flange bolt assembly 58 of FIG. 2. In the illustrated example, the deformable spacer 100 includes a hollow cylindrical body 102 with a body longitudinal axis 104, a first spacer flange 106 disposed at a first body end 108 of the hollow cylindrical body 102, and a second spacer flange 110 disposed at a second body end 112 that is axially opposite the first body end 108. The hollow cylindrical body 102 has a body outer surface 114 having a body outer diameter $OD_b$ and a body inner surface 116 having a body inner diameter $ID_b$ as shown in FIG. 4. While the hollow cylindrical body 102 is illustrated herein as being cylindrical in cross-section, the hollow cylindrical body 102 may have other cross-sectional shapes that suitable for providing spacing and absorbing energy through plastic deformation, such as triangular, rectangular, hexagonal, elliptical and the like, and are contemplated by the inventor.

To facilitate insertion of the flange bolt 60 through the hollow cylindrical body 102 and to reduce stress concentrations, the hollow cylindrical body 102 may include a first beveled transition surface 118 at the first body end 108 and a second beveled transition surface 120 (FIG. 5) at the second body end 112. The beveled transition surfaces 118, 120 have a minimum diameter at the intersection with the body inner surface 116, with the diameter increasing as the beveled transition surfaces 118, 120 extend axially outward through the spacer flanges 106, 110, respectively. The spacer flanges 106, 110 have a flange outer diameter $OD_f$ (FIG. 4) that is greater than the body outer diameter $OD_b$, so the spacer flanges 106, 110 extend radially outwardly beyond the body outer surface 114. The body outer surface 114 may include rounded transition surfaces 122, 124 at the intersections with the spacer flanges 106, 110. Similar to the beveled transition surfaces 118, 120, the rounded transition surfaces 122, 124 may reduce stress concentrations when the deformable spacer 100 is compressed as discussed further below.

The deformable spacer 100 in the present example includes a plurality of elongated slots 126 extending through the hollow cylindrical body 102 from the body inner surface 116 to the body outer surface 114. As shown, six elongated slots 126 are circumferentially spaced about the hollow cylindrical body 102. Each of the plurality of elongated slots 126 is oriented substantially parallel to the body longitudinal axis 104. The elongated slots 126 have planar side portions that are parallel to the body longitudinal axis 104, and terminate at rounded ends proximate the spacer flanges 106, 110.

Figure 6:
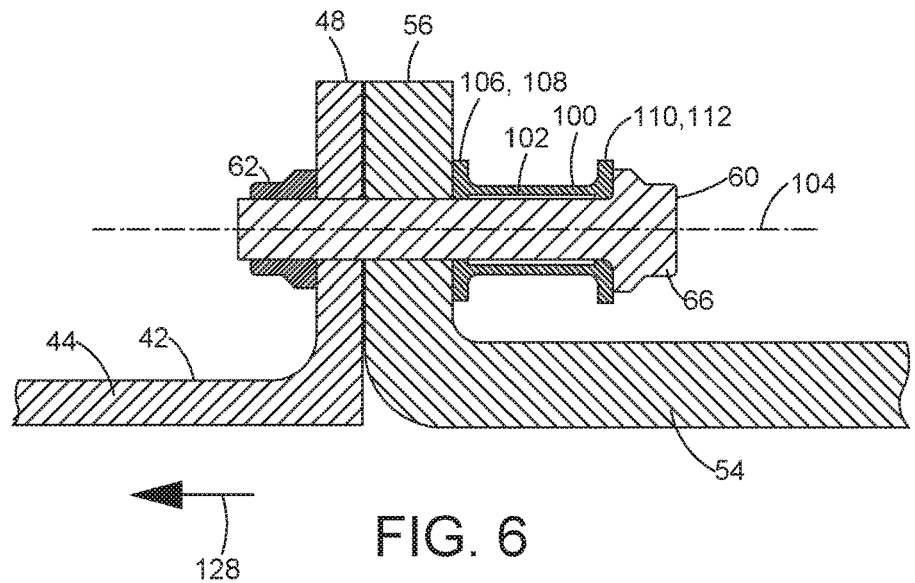
FIG. 6 is a side cross-sectional view of a portion of FIG. 2 including the deformable spacer of FIG. 3.

FIG. 6 illustrates an enlarged cross-sectional view of the deformable spacer 100 installed with the flange bolt 60 and nut 62 to secure the fan case flange 56 to the inlet flange 48. The deformable spacer 100 encircles the flange bolt 60 so the deformable spacer 100 and the flange bolt 60 are approximately concentric about the body longitudinal axis 104. The nut 62 is tightened so that the fan case flange 56 and the flange bolt head 66 apply a compressive axial load parallel to the body longitudinal axis 104 to the hollow cylindrical body 102. When the fan case 54 is subjected to an impact load tending to pull the inlet 26 away from the engine case 30 as indicated by the arrow 128, the compressive axial load on the hollow cylindrical body 102 increases as the inlet flange 48 is pulled away from the fan case flange 56 by the impact load and is resisted by the flange bolt head 66.

Figure 7:
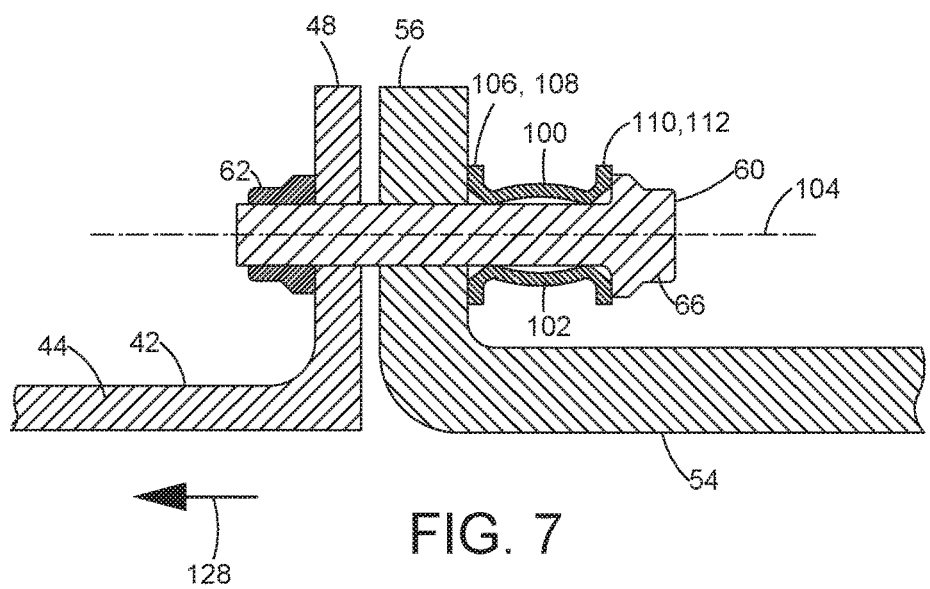
FIG. 7 is the side cross-sectional view of FIG. 6 with an inlet flange separated from a fan case flange by an impact load.

When the compressive axial load exceeds a minimum buckling load the deformable spacer 100, the hollow cylindrical body 102 will begin to buckle and plastically deform, and the inlet flange 48 will separate from the fan case flange 56 as shown in FIG. 7. The hollow cylindrical body 102 functions as a plastic hinge that absorbs the energy of the impact load as the hollow cylindrical body 102 experiences plastic strain. After the impact load is absorbed, the deformable spacers 100 maintain their deformed shape, but the flanges 48, 56, the flange bolts 60 and the nuts 62 are intact, and the inlet 26 remains attached to the engine case 30 until the deformable spacers 100 can be replaced.

The dimensions of the elongated slots 126 and the number of elongated slots 126, the radial thickness of the hollow cylindrical body 102 and the material from which the deformable spacer 100 is fabricated are selected so that the deformable spacer 100 will buckle elastically and absorb energy in a controlled manner to prevent damage to the flanges 48, 56 and the flange bolt 60. The deformable spacer 100 may be constructed from a variety of materials that can buckle elastically when a compressive axial load applied in parallel to the body longitudinal axis 104 exceeds a minimum buckling load, and then absorbs energy as the material deforms and experiences plastic strain. Such materials can include steel, aluminum, titanium, shape memory alloys, plastic or other suitable materials.

Various alternative geometries are contemplated for the elongated slots 126. The elongated slots 126 may be wider or narrower, or longer or shorter than illustrated in FIGS. 2-5. Moreover, the planar side portions may have other geometries such as rounded, or may be comprised of multiple planar sections that are oriented at angles with respect to each other. The deformable spacer 100 alternatively could have as few as two elongated slots 126 that are diametrically opposed to each other on the hollow cylindrical body 102, or any greater number of elongated slots 126 that may or may not be circumferentially spaced about the hollow cylindrical body 102.

Figure 8:
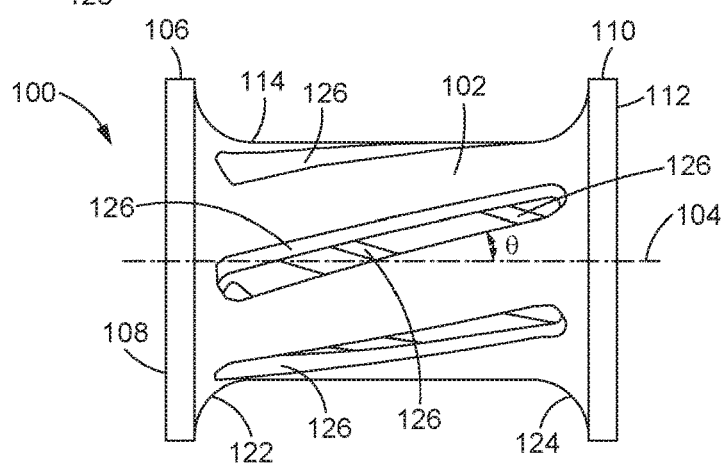
FIG. 8 is an isometric view of an alternative example of a deformable spacer in accordance with the present disclosure.

In other alternative examples, each of the elongated slots 126 may be oriented relative to the body longitudinal axis 104 and an angle that is greater than 0° and less than 90°. FIG. 8 illustrates an example of the deformable spacer 100 where the elongated slots 126 are oriented at an angle θ within the range of 5° and 45° with respect to the body longitudinal axis 104. In particular, the angle θ of the elongated slots 126 may be approximately 15° with respect to the body longitudinal axis 104. Any combination of the dimensions and orientation of the elongated slots 126, the radial thickness of the hollow cylindrical body 102 of the material of the deformable spacer 100 necessary to achieve a desired controlled buckling and energy absorption under anticipated impact loads are contemplated.

In one example, the dimensions and number of the elongated slots 126, and the material and the radial thickness of the hollow cylindrical body 102 may be selected so that the deformable spacers 100 may handle impact loads creating compressive axial loads up to 12,000 pounds per deformable spacer 100. The deformable spacers 100 may have a minimum buckling load in the range of 4,000 lb.-9,000 lb. above which plastic deformation occurs, and may continue plastic deformation up to a maximum compressive load in the range of 7,000 lb.-12,000 lb. Under these loading conditions, the deformable spacers 100 may have an amount of energy absorption during plastic strain in a range of 7,000 in-lb. to 20,000 in-lb. Selecting the material and the dimensions of the hollow cylindrical body 102 and the number and dimensions of the elongated slots 126 to meet the operating conditions will be within the capabilities of the person skilled in the art based on the present disclosure.

Figure 9:
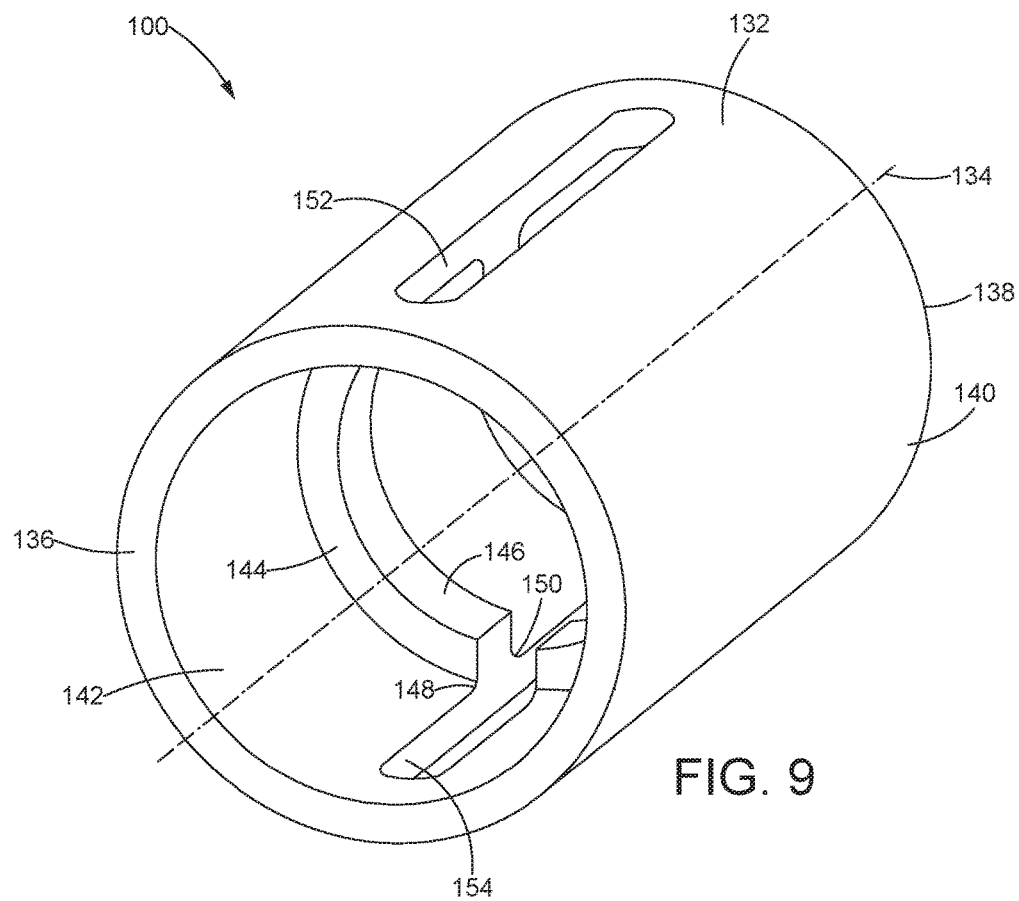
FIG. 9 is an isometric view of a further alternative example of a deformable spacer in accordance with the present disclosure.
Figure 10:
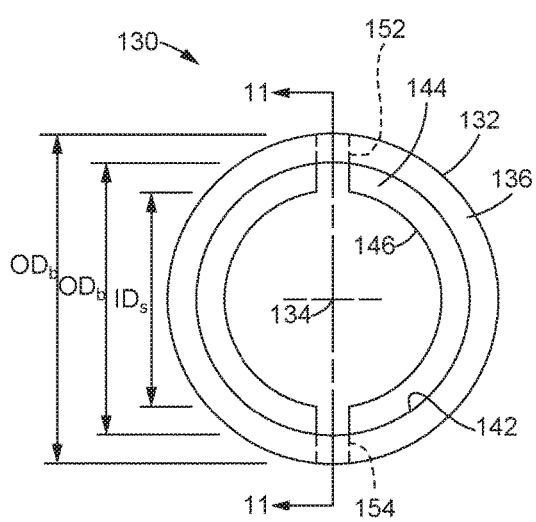
FIG. 10 is an end view of the deformable spacer of FIG. 9.
Figure 11:
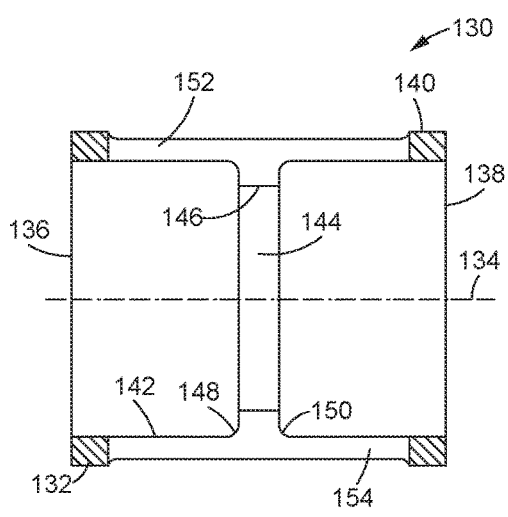
FIG. 11 is a cross-sectional view of the deformable spacer of FIG. 9 taken through line 11-11 of FIG. 10.

FIGS. 9-11 illustrate an alternative example of a deformable spacer 130 that may function in a similar manner as the deformable spacer 100 with a modified failure mode. Referring to the isometric view of FIG. 9, the deformable spacer 130 may have a hollow cylindrical body 132 that is generally similar to the hollow cylindrical body 102, and has a body longitudinal axis 134, a first body end 136, and a second body end 138 that is axially opposite the first body end 136. The hollow cylindrical body 132 has a body outer surface 140 having a body outer diameter $OD_b$ and a body inner surface 142 having a body inner diameter $ID_b$ as shown in FIG. 10.

The body inner diameter $ID_b$ of the hollow cylindrical body 132 may be larger than the body inner diameter $ID_b$ of the hollow cylindrical body 102 so that space exists between the body inner surface 142 and the flange bolt shank when the flange bolt 60 is inserted. The space allows an annular stiffener 144 to extend inwardly from the body inner surface 142 with a stiffener inner surface 146 having a stiffener inner diameter $ID_s$ that is less than the body inner diameter $ID_b$ but greater than an outer diameter of the flange bolt shank so that the stiffener inner surface 146 is disposed proximate the flange bolt shank. The annular stiffener 144 may be positioned approximately equidistant along the body longitudinal axis 134 between the first body end 136 and the second body end 138. At the point that the annular stiffener 144 extends from the body inner surface 142, rounded transition surfaces 148, 150 may reduce stress concentrations when the deformable spacer 130 is compressed.

The deformable spacer 130 in the illustrated example may include a first elongated slot 152 and a second elongated slot 154 extending through the hollow cylindrical body 132 from the body outer surface 140 to the body inner surface 142 and through the annular stiffener 144. The second elongated slot 154 is positioned substantially diametrically opposite the first elongated slot 152. As shown in the figures, the elongated slots 152, 154 are substantially parallel to the body longitudinal axis 134. However, the elongated slots 152, 154 may be oriented at an angle with respect to the body longitudinal axis 134, such as at the angle θ of the elongated slots 126 is shown in FIG. 8. In other examples, a plurality of additional elongated slots (not shown) may extend through the hollow cylindrical body 132 and the annular stiffener 144 and be circumferentially spaced about the hollow cylindrical body 132 with the elongated slots 152, 154.

Figure 12:
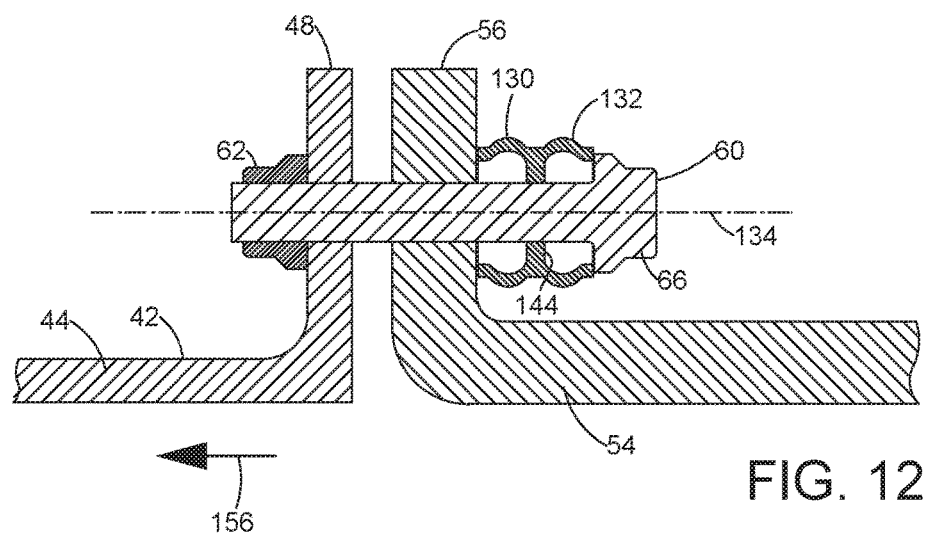
FIG. 12 is a side cross-sectional view of a portion of FIG. 2 including the deformable spacer of FIG. 9 and the inlet flange separated from the fan case flange by an impact load.

FIG. 12 shows the deformable spacer 130 installed and partially deformed by an impact load applied to the inlet 26 in the direction of an arrow 156. The annular stiffener 144 provides support proximate the longitudinal center of the hollow cylindrical body 132 against radial stresses created by the compressive axial load that tends to force the hollow cylindrical body 132 radially outwardly. Consequently, the hollow cylindrical body 132 will first begin buckling on either side of the annular stiffener 144 is shown in FIG. 12 when the compressive axial load exceeds the minimum buckling load. As with the deformable spacer 100, the deformable spacer 130 may be configured as necessary to control buckling and energy absorption for the anticipated impact loads. Factors such as the material of the deformable spacer 130, the radial thickness of the hollow cylindrical body 132, the radial thickness and the longitudinal width of the annular stiffener 144, and the configurations of the elongated slots 152, 154 can be varied. Though not shown, flanges similar to the spacer flanges 106, 110 of the deformable spacer 100 may be included at the body ends 136, 138, respectively.

Figure 13:
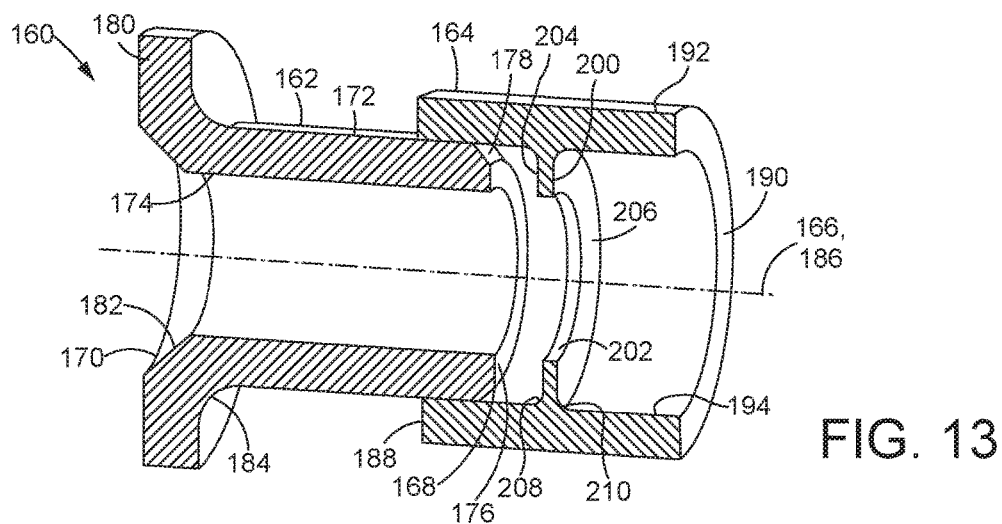
FIG. 13 is cross-sectional view of a spacer assembly in accordance with the present disclosure.
Figure 14:
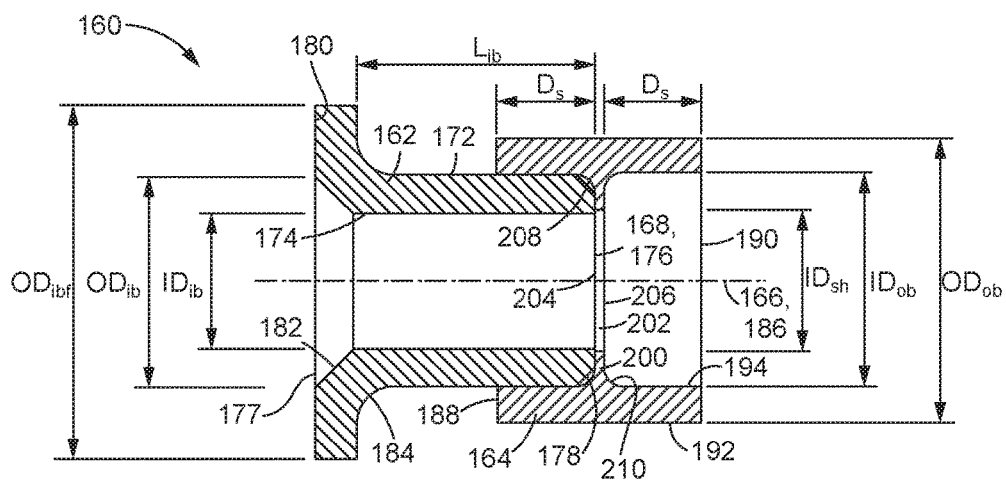
FIG. 14 is a cross-sectional view of the spacer assembly of FIG. 13 with an inner body engaging an annular shoulder of an outer body.

FIGS. 13 and 14 illustrate an alternative example of a spacer assembly 160 where energy absorption occurs during an impact load by shearing within the spacer assembly 160 in contrast to the plastic deformation of the deformable spacers 100, 130 discussed above. Referring to FIG. 13, the spacer assembly 160 may have a two-piece construction including an inner body 162 and an outer body 164. In the illustrated example, the inner body 162 is a generally hollow cylinder having an inner body longitudinal axis 166, a first inner body end 168, and a second inner body end 170 axially opposite the first inner body end 168. An inner body outer surface 172 has an inner body outer diameter $OD_{ib}$, and an inner body inner surface 174 has an inner body outer diameter $ID_{ib}$ (FIG. 14), with the inner body inner diameter $ID_{ib}$ configured such that the inner body inner surface 174 is proximate the flange bolt shank when the flange bolt shank is inserted into the inner body 162.

The first inner body end 168 has an inner body end surface 176 that is annular and substantially perpendicular to the inner body longitudinal axis 166. To facilitate insertion of the first inner body end 168 into the outer body 164 as described below, an annular chamfer 178 may serve as an inner body transition from the inner body outer surface 172 to the inner body end surface 176. An inner body flange 180 may be disposed at the second inner body end 170 and have an inner body flange outer diameter $OD_{ibf}$ that is greater than the inner body outer diameter $OD_{ib}$ so the inner body flange 180 extends radially outwardly via the inner body outer surface 172. To facilitate insertion of the flange bolt 60 through the inner body 162 and to reduce stress concentrations, the inner body 162 may include a beveled transition surface 182 at the second inner body end 170 having a minimum diameter at the intersection with the inner body inner surface 174, with the diameter increasing as the beveled transition surface 182 extends axially outward through the inner body flange 180. The inner body outer surface 172 may include a rounded transition surface 184 at the intersection with the inner body flange 180 to further reduce stress concentrations when the spacer assembly 160 is compressed as discussed further below.

The outer body 164 may also be a generally hollow cylinder having an outer body longitudinal axis 186, a first outer body end 188, and a second outer body end 190 axially opposite the first outer body end 188. An outer body outer surface 192 has an outer body outer diameter $OD_{ob}$, and an outer body inner surface 194 has an outer body outer diameter $ID_{ob}$ (FIG. 14). The outer body inner diameter $ID_{ob}$ is configured such that the outer body inner surface 194 is proximate the inner body outer surface 172 when the inner body end surface 176 is inserted into the outer body 164 through either the first outer body end 188 or the second outer body end 190. In this way, the longitudinal axes 166, 186 are substantially coincident and the inner body 162 and the outer body 164 are substantially concentric when the inner body 162 is inserted into the outer body 164.

In the illustrated example, the outer body 164 includes an annular shoulder 200 extending inwardly from the outer body inner surface 194 with a shoulder inner surface 202 having a shoulder inner diameter $ID_{sh}$ that is less than the outer body inner diameter $ID_{ob}$ but greater than the shank outer diameter so that the flange bolt shank can be inserted past the shoulder inner surface 202. The annular shoulder 200 may have a first shoulder engagement surface 204 on a side proximate the first outer body end 188 and a second shoulder engagement surface 206 on a side proximate the second outer body end 190, with the shoulder engagement surfaces 204, 206 being annular and substantially perpendicular to the outer body longitudinal axis 186. At the point that the shoulder engagement surfaces 204, 206 extend from the outer body inner surface 194, rounded transition surfaces 208, 210, respectively, may reduce stress concentrations when the inner body end surface 176 engages one of the shoulder engagement surfaces 204, 206 as discussed further below. Additionally, as seen in FIG. 14, the annular chamfer 178 and the rounded transition surfaces 208, 210 are configured so that the inner body end surface 176 does not engage the rounded transition surfaces 208, 210, and instead faces and abuts the shoulder engagement surfaces 204, 206 when the inner body 162 is inserted.

The annular shoulder 200 may be positioned approximately equidistant along the outer body longitudinal axis 186 between the first outer body end 188 and the second outer body end 190. As shown in FIG. 14, the inner body 162 may have an inner body length $L_{ib}$ from the inner body end surface 176 to the inner body flange 180 that is greater than a shoulder distance $D_s$ of the outer body 164 from the first shoulder engagement surface 204 to the first outer body end 188. In alternative examples, the inner body length $L_{ib}$ may be measured from the first inner body end 168 to the second inner body end 170 so long as the first inner body end 168 may be inserted into the outer body 164 until the inner body end surface 176 engages the first shoulder engagement surface 204 and the second inner body end 170 extends beyond the first outer body end 188. The shoulder distance $D_s$ may also represent the distance from the second shoulder engagement surface 206 to the second outer body end 190 so that the inner body 162 may be inserted into the second outer body end 190 in the spacer assembly 160 will perform in the manner described below.

Figure 15:
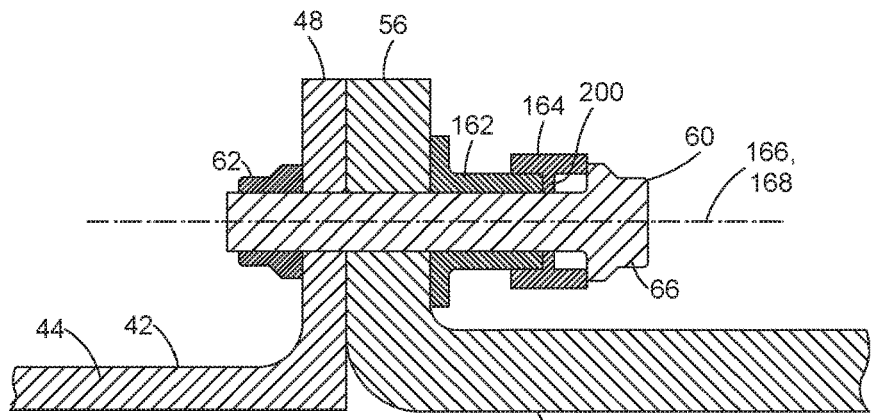
FIG. 15 is a side cross-sectional view of a portion of FIG. 2 including the spacer assembly of FIG. 13.

FIG. 15 illustrates an enlarged cross-sectional view of the spacer assembly 160 installed with the flange bolt 60 and nut 62 to secure the inlet flange 48 to the fan case flange 56. The first inner body end 168 is inserted into the first outer body end 188 and the spacer assembly 160 encircles the flange bolt 60 so the spacer assembly 160 and the flange bolt 60 are approximately concentric about the longitudinal axes 166, 186. The nut 62 is tightened so that the fan case flange 56 and the flange bolt head 66 apply a compressive axial load parallel to the longitudinal axes 166, 186 forcing the first inner body end 168 into contact with the annular shoulder 200 and the inner body end surface 176 into engagement with the first shoulder engagement surface 204. When the inlet 26 is subjected to an impact load tending to pull the inlet attachment ring 42 away from the fan case 54 as indicated by the arrow 212, the compressive axial load increases as the inlet flange 48 is pulled away from the fan case flange 56 by the impact load and is resisted by the flange bolt head 66. The force of the inner body end surface 176 on the first shoulder engagement surface 204 creates shear stresses in the annular shoulder 200.

Figure 16:
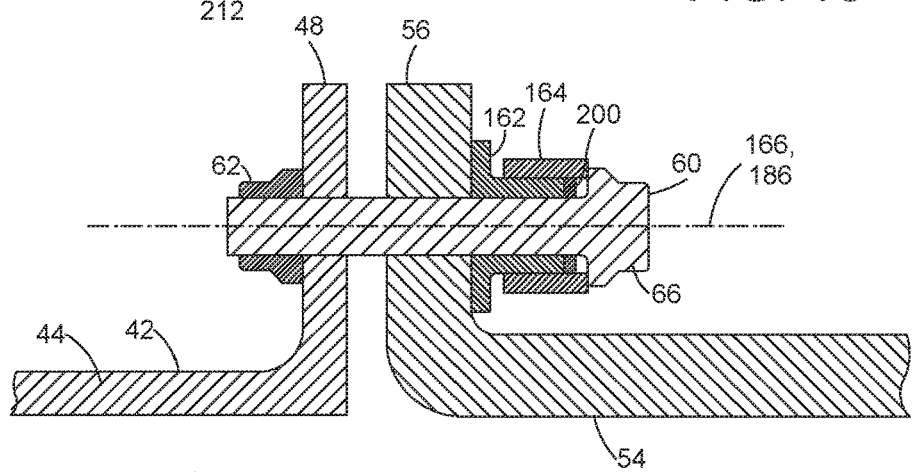
FIG. 16 is the side cross-sectional view of FIG. 15 with the inlet flange separated from the fan case flange by an impact load.

When the compressive axial load on the spacer assembly 160 exceeds a predetermined sheer failure load, the annular shoulder 200 will begin to fail in shear, and the inlet flange 48 will separate from the fan case flange 56 as shown in FIG. 16. The annular shoulder 200 absorbs the energy of the impact load as the annular shoulder 200 experiences the shear stresses and a portion of the annular shoulder 200 shears from the outer body 164. After the impact load is absorbed, the flanges 48, 56, the flange bolts 60 and the nuts 62 are intact, and the inlet 26 remains attached to the engine case 30 despite the need to replace the outer bodies 164 due to the shearing off of the portions of the annular shoulders 200. In one example, the annular shoulder 200 may be configured so that the predetermined shear failure load is within the range of 4,000 lb.-12,000 lb., and with an energy absorption at the point of shearing of the annular shoulder 200 being within the range of 7,000 in-lb.-20,000 in-lb. Factors such as the materials of the inner body 162 and the outer body 164, the radial thickness of the hollow cylindrical body 132, and the radial thickness and the longitudinal width of the annular shoulder 200 can be varied to achieve the necessary predetermined shear failure load and energy absorption for a particular implementation of the spacer assembly 160.

Figure 17:
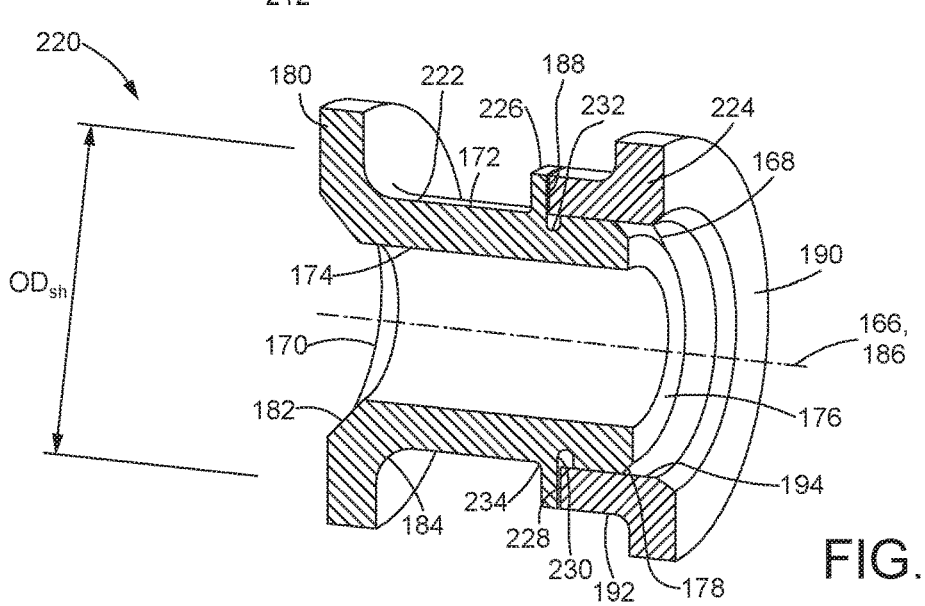
FIG. 17 is an isometric view of an alternative example of a spacer assembly in accordance with the present disclosure.

FIG. 17 illustrates an alternative example of a spacer assembly 220 having an inner body 222, an outer body 224, and an annular shoulder 226 extending from the inner body 222. In the following discussion, elements of the spacer assembly 220 that are similar to elements of the spacer assembly 160 as described above are identified with the same reference numerals. In the alternative example, the annular shoulder 226 extends outwardly from the inner body outer surface 172 with a shoulder outer surface 228 having a shoulder outer diameter $OD_{sh}$ that is greater than the outer body inner diameter $ID_{ob}$ and may be approximately equal to the outer body outer diameter $OD_{ob}$. The annular shoulder 226 may have a shoulder engagement surface 230 on a side proximate the inner body end surface 176, with the shoulder engagement surface 230 being annular and substantially perpendicular to the inner body longitudinal axis 166. Rounded transition surfaces 232, 234 may reduce stress concentrations when the first outer body end 188 makes contact with the annular shoulder 226 and engages the shoulder engagement surface 230 to prevent the inner body 222 from passing through the outer body 224 as discussed further below.

The annular shoulder 226 may be axially positioned on the inner body outer surface 172 at a distance from the first inner body end 168 that is greater than a length of the outer body 224 so that the first inner body end 168 does not extend beyond the second outer body end 190 and the first outer body end 188 engages the shoulder engagement surface 230. The spacer assembly 220 will function in a generally similar manner as the spacer assembly 160 on the occurrence of an impact load. When the compressive axial load on the spacer assembly 220 exceeds the predetermined sheer failure load, the annular shoulder 226 will begin to fail in shear, and the inlet flange 48 will separate from the fan case flange 56. The annular shoulder 226 absorbs the energy of the impact load as the annular shoulder 226 experiences the shear stresses and a portion of the annular shoulder 226 shears from the inner body 222. After the impact load is absorbed, the flanges 48, 56, the flange bolts 60 and the nuts 62 are intact, and the inlet 26 remains attached to the engine case 30 despite the inner bodies 222 requiring replacement due to the shearing off of the portions of the annular shoulders 226.

Figure 18:
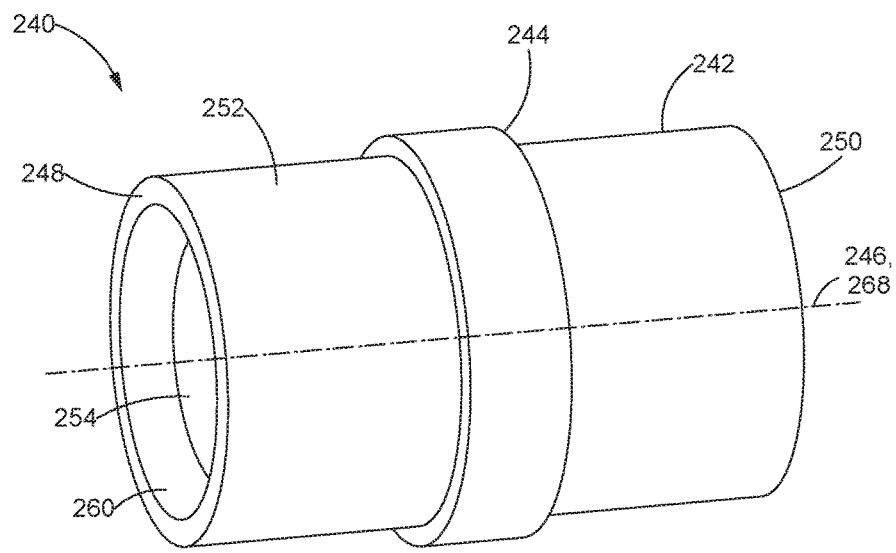
FIG. 18 is an isometric view of a further alternative example of a spacer assembly in accordance with the present disclosure.
Figure 19:
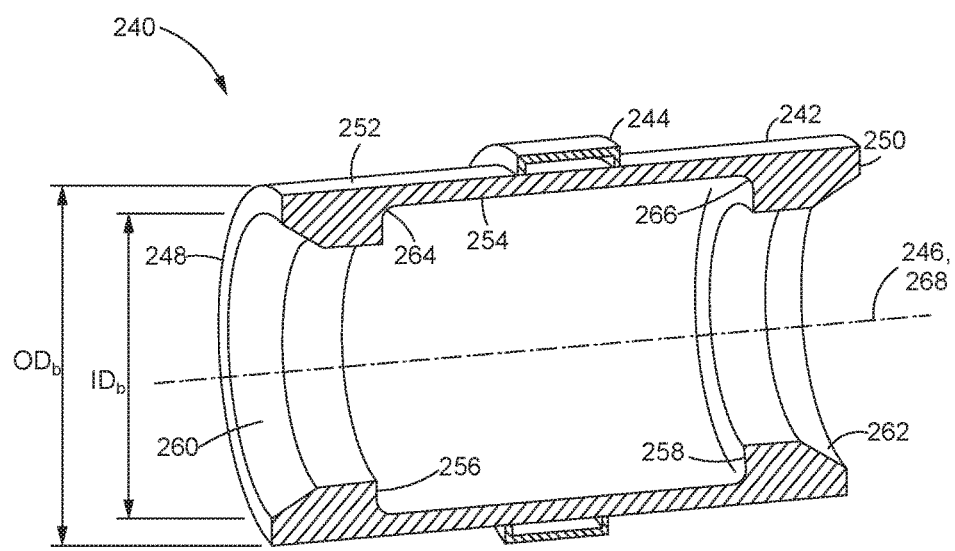
FIG. 19 is a cross-sectional view of the spacer assembly of FIG. 18.

A further alternative example of a spacer assembly 240 is illustrated in FIGS. 18 and 19. The spacer assembly 240 may include a hollow cylindrical body 242 surrounded by an annular belt 244. The hollow cylindrical body 242 may have a body longitudinal axis 246, a first body end 248 and a second body end 250 axially opposite the first body end 248. The hollow cylindrical body 242 further includes a body outer surface 252 having a body outer diameter $OD_b$ and a body inner surface 254 having a body inner diameter $ID_b$ as shown in FIG. 19. FIG. 19 further illustrates that the body inner diameter $ID_b$ and a body radial thickness of the body inner surface 254 may vary such that the body radial thickness is greater proximate the first body end 248 and the second body end 250 than proximate a longitudinal center of the hollow cylindrical body 242 about which the annular belt 244 is positioned. Consequently, the body inner surface 254 may define a first annular shoulder 256 proximate the first body end 248 and a second annular shoulder 258 proximate the second body end 250 where the body inner diameter $ID_b$ is less than the body inner diameter $ID_b$ proximate the longitudinal center. Beveled transition surfaces 260, 262 between the body ends 248, 250, respectively, and the body inner surface 254 may facilitate insertion of the flange bolt 60 through the hollow cylindrical body 242, and rounded transition surfaces 264, 266 in the body inner surface 254 proximate the annular shoulders 256, 258, respectively, may reduce stress concentrations when the hollow cylindrical body 242 is compressed as discussed further below.

The annular belt 244 is disposed on the body outer surface 252 and engages the body outer surface 252 to retain the annular belt 244 in position relative to the body ends 248, 250. The annular belt 244 may be press fit onto the hollow cylindrical body 242, and may be heated and expanded to facilitate sliding the annular belt 244 onto the hollow cylindrical body 242, with the annular belt 244 being tightly fitting on the body outer surface 252 as the annular belt 244 cools and contracts. A belt longitudinal axis 268 of the annular belt 244 may be substantially coincident with the body longitudinal axis 246 and the hollow cylindrical body 242 and the annular belt 244 may be substantially concentric when the annular belt 244 is disposed on the body outer surface 252. In the illustrated example as best seen in FIG. 19, the annular belt 244 has a rectangular cross-sectional shape in a cross-section taken by a plane that is parallel to the belt longitudinal axis 268.

The rectangular cross-sectional shape may approximate a U-shape such that the annular belt 244 and the body outer surface 252 define an annular space there between when the annular belt 244 is installed. Alternatively, the cross-sectional shape may be a solid rectangle so that no space exists between the annular belt 244 and the body outer surface 252 when the annular belt 244 is installed. Those skilled in the art will understand that the annular belt 244 may have other cross-sectional shapes allowing the annular belt 244 to be disposed on the hollow cylindrical body 242 and engage the body outer surface 252. Such cross-sectional shapes can include a circular, elliptical, flat on the inside and rounded on the outside, or vice versa, rectangular with beveled or chamfered edges, and the like. Such shapes are contemplated by the inventors as having use in spacer assemblies 240 in accordance with the present disclosure.

Figure 20:
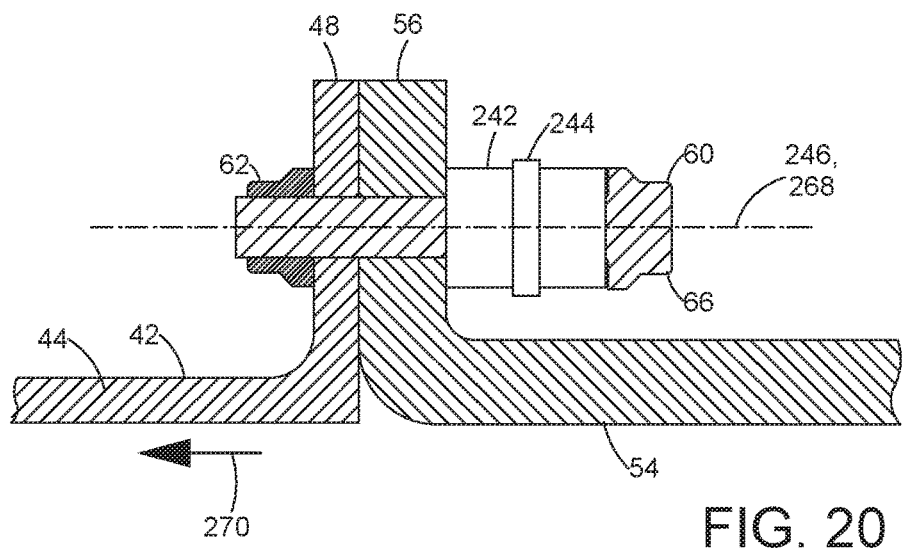
FIG. 20 is a side cross-sectional view of a portion of FIG. 2 including the spacer assembly of FIG. 18 shown in solid.

FIG. 20 illustrates an enlarged cross-sectional view of the spacer assembly 240 installed with the flange bolt 60 and nut 62 to secure the inlet flange 48 to the fan case flange 56. The spacer assembly 240 encircles the flange bolt 60 so the spacer assembly 240 and the flange bolt 60 are approximately concentric about the longitudinal axes 246, 268. The nut 62 is tightened so that the fan case flange 56 and the flange bolt head 66 apply a compressive axial load to the hollow cylindrical body 242 parallel to the longitudinal axes 246, 268. When the inlet 26 is subjected to an impact load tending to pull the inlet attachment ring 42 away from the fan case 54 as indicated by the arrow 270, the compressive axial load increases as the inlet flange 48 is pulled away from the fan case flange 56 by the impact load and is resisted by the flange bolt head 66. The compressive load on the hollow cylindrical body 242 creates radial stresses tending to increase the body outer diameter $OD_b$.

Figure 21:
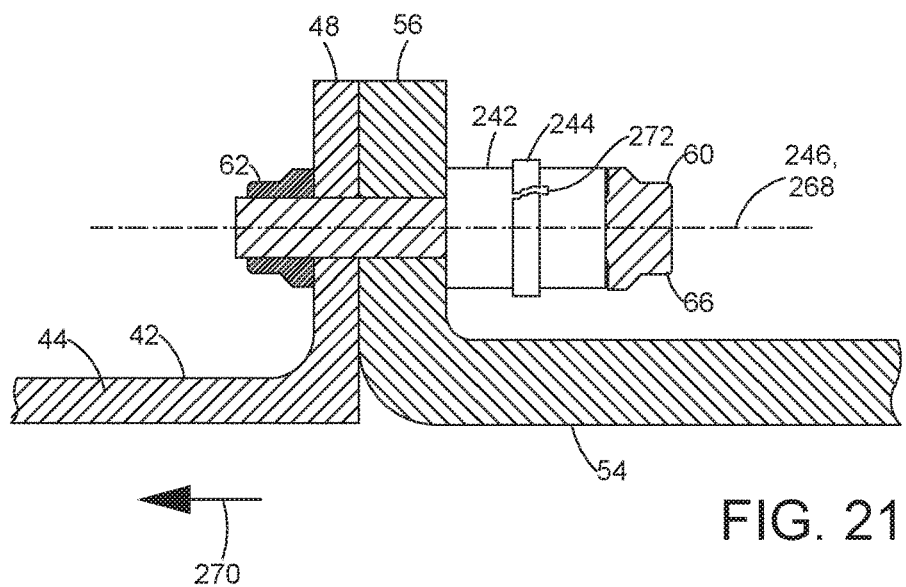
FIG. 21 is the side cross-sectional view of FIG. 20 with an annular belt ruptured by an impact load.
Figure 22:
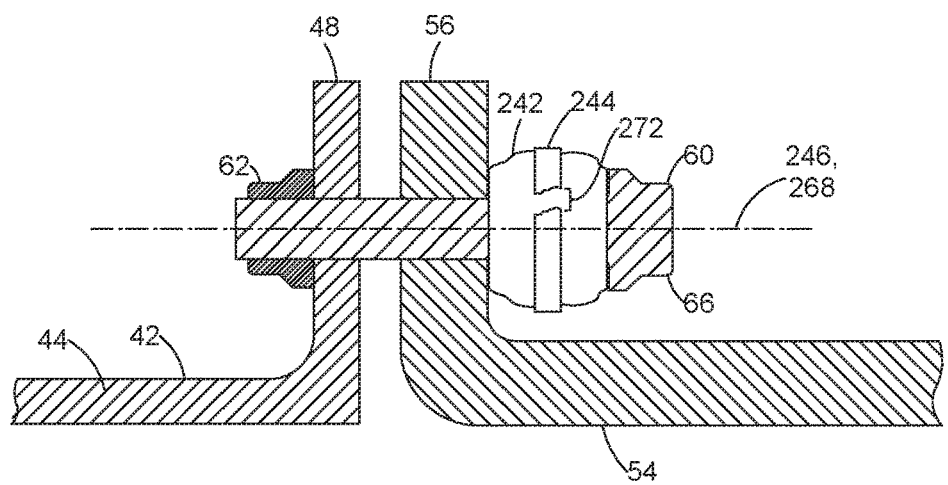
FIG. 22 is the side cross-sectional view of FIG. 20 with the inlet flange separated from the fan case flange by the impact load.

The outward biasing of the body outer surface 252 is transferred to the annular belt 244, thereby creating hoop stresses in the annular belt 244 as the load transferred from the hollow cylindrical body 242 tries to enlarge the annular belt 244. The annular belt 244 is configured so that the annular belt 244 will rupture before the hollow cylindrical body 242 buckles and plastically deforms. As shown in FIG. 21, the annular belt 244 fails at a rupture location 272 when the compressive axial load exceeds a predetermined belt rupture load that is less than the minimum buckling load for the hollow cylindrical body 242. At the point of rupturing, the annular belt 244 has absorbed at least a portion of the energy in the impact load. After rupturing, the annular belt 244 may provide minimal additional support against the compressive axial load. If the compressive axial load increases beyond the minimum buckling load, the hollow cylindrical body 242 begins to buckle and plastically deform in a similar manner as the deformable spacer 100, and the inlet flange 48 will separate from the fan case flange 56 as shown in FIG. 22. In an exemplary example, the predetermined belt rupture load for the annular belt 244 may be approximately 5,000 lb., the maximum compressive load for the hollow cylindrical body 242 may be in the range of 5,000 lb.-12,000 lb., and the energy absorption of the spacer assembly 240 may be in the range of 7,000 in-lb.-12,000 in-lb. The loading and failure characteristics of the spacer assembly 240 may be configured for a particular implementation by varying the radial thickness of the hollow cylindrical body 242, the radial thickness, the longitudinal width and the cross-sectional shape of the annular belt 244, and the materials from which the hollow cylindrical body 242 and the annular belt 244 are fabricated.

INDUSTRIAL APPLICABILITY

With the use of the various examples of deformable spacers 100, 130 and spacer assemblies 160, 220, 240, flange bolts 60 may be selected that have a lighter weight and/or lower-cost material that is capable of withstanding impact loads occurring in the engines 18, 20. The deformable spacers 100, 130 and spacer assemblies 160, 220, 240 absorb some of the energy that would otherwise be transmitted to the flange bolts 60. Further, the design of the parts, such as the flanges 48, 56, may be made in a manner that reduces weight and/or expense where the deformable spacers 100, 130 and spacer assemblies 160, 220, 240 are implemented.

While the preceding text sets forth a detailed description of numerous different examples, it should be understood that the legal scope of protection is defined by the words of the claims set forth at the end of this patent. The detailed description is to be construed as exemplary only and does not describe every possible example since describing every possible example would be impractical, if not impossible. Numerous alternative examples could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A deformable spacer for absorbing energy for a flange bolt, the deformable spacer comprising:
   a hollow cylindrical body having a first body end, a second body end, a body outer surface having a body outer diameter, a body inner surface having a body inner diameter and a body longitudinal axis;
   a plurality of elongated slots extending through the hollow cylindrical body from the body inner surface to the body outer surface, wherein the plurality of elongated slots are circumferentially spaced about the hollow cylindrical body;
   a first flange disposed at the first body end and having a first flange outer diameter that is greater than the body outer diameter; and
   a second flange disposed at the second body end and having a second flange outer diameter that is greater than the body outer diameter.

2. The deformable spacer of claim 1, wherein each of the plurality of elongated slots is substantially parallel to the body longitudinal axis.

3. The deformable spacer of claim 1, wherein each of the plurality of elongated slots is oriented relative to the body longitudinal axis at an angle that is greater than 0° and less than 90°.

4. The deformable spacer of claim 1, wherein the plurality of elongated slots comprises six elongated slots.

5. The deformable spacer of claim 1, wherein the hollow cylindrical body comprises an annular stiffener extending inwardly from the body inner surface and having a stiffener inner diameter that is less than the body inner diameter, and wherein the annular stiffener is disposed approximately equidistant from the first body end and the second body end.

6. The deformable spacer of claim 1, wherein the first flange outer diameter is equal to the second flange outer diameter.

7. The deformable spacer of claim 1, further comprising a first rounded transition surface at an intersection of the first flange and the body outer surface and a second rounded transition surface at an intersection of the second flange and the body outer surface.

8. The deformable spacer of claim 1, wherein the hollow cylindrical body further comprises a first beveled transition surface at the first body end and a second beveled transition surface at the second body end, the first and second beveled transition surfaces having a minimum diameter at an intersection with the body inner surface and a maximum diameter at the respective body end.

9. A deformable spacer for absorbing energy for a flange bolt, the deformable spacer comprising:
 a hollow cylindrical body having a first body end, a second body end, a body outer surface having a body outer diameter, a body inner surface having a body inner diameter and a body longitudinal axis;
 a first flange disposed at the first body end and having a first flange outer diameter that is greater than the body outer diameter; and
 a second flange disposed at the second body end and having a second flange outer diameter that is greater than the body outer diameter.

10. The deformable spacer of claim 9, further comprising a plurality of elongated slots extending through the hollow cylindrical body from the body inner surface to the body outer surface, wherein the plurality of elongated slots are circumferentially spaced about the hollow cylindrical body.

11. The deformable spacer of claim 10, wherein each of the plurality of elongated slots is substantially parallel to the body longitudinal axis.

12. The deformable spacer of claim 10, wherein each of the plurality of elongated slots is oriented relative to the body longitudinal axis at an angle that is greater than 0° and less than 90°.

13. The deformable spacer of claim 10, wherein the plurality of elongated slots comprises six elongated slots.

14. The deformable spacer of claim 9 wherein the first flange outer diameter is equal to the second flange outer diameter.

15. The deformable spacer of claim 9, further comprising a first rounded transition surface at an intersection of the first flange and the body outer surface and a second rounded transition surface at an intersection of the second flange and the body outer surface.

16. The deformable spacer of claim 9, wherein the hollow cylindrical body further comprises a first beveled transition surface at the first body end and a second beveled transition surface at the second body end, the first and second beveled transition surfaces having a minimum diameter at an intersection with the body inner surface and a maximum diameter at the respective body end.

17. A deformable spacer for absorbing energy for a flange bolt, the deformable spacer comprising:
 a hollow cylindrical body having a first body end, a second body end, a body outer surface having a body outer diameter, a body inner surface having a body inner diameter, a body longitudinal axis, a first beveled transition surface at the first body end and a second beveled transition surface at the second body end, the first and second beveled transition surfaces having a minimum diameter at an intersection with the body inner surface and a maximum diameter at the respective body end; and
 a plurality of elongated slots extending through the hollow cylindrical body from the body inner surface to the body outer surface, wherein the plurality of elongated slots are circumferentially spaced about the hollow cylindrical body.

18. The deformable spacer of claim 17, wherein each of the plurality of elongated slots is substantially parallel to the body longitudinal axis.

19. The deformable spacer of claim 17, wherein each of the plurality of elongated slots is oriented relative to the body longitudinal axis at an angle that is greater than 5° and less than 45°.

20. The deformable spacer of claim 17, wherein the plurality of elongated slots comprises exactly two elongated slots diametrically opposed to each other on the hollow cylindrical body.

* * * * *